(12) United States Patent
Izumi et al.

(10) Patent No.: US 11,452,427 B2
(45) Date of Patent: Sep. 27, 2022

(54) CLEANING SHEET

(71) Applicant: DAIO PAPER CORPORATION, Shikokuchuo (JP)

(72) Inventors: Shinya Izumi, Shikokuchuo (JP); Naoki Shintani, Shikokuchuo (JP); Asako Fushimi, Shikokuchuo (JP)

(73) Assignee: DAIO PAPER CORPORATION, Shikokuchuo (JP)

( * ) Notice: Subject to any disclaimer, the term of this patent is extended or adjusted under 35 U.S.C. 154(b) by 386 days.

(21) Appl. No.: 16/618,875

(22) PCT Filed: May 23, 2018

(86) PCT No.: PCT/JP2018/019762
§ 371 (c)(1),
(2) Date: Dec. 3, 2019

(87) PCT Pub. No.: WO2018/230283
PCT Pub. Date: Dec. 20, 2018

(65) Prior Publication Data
US 2020/0085273 A1 Mar. 19, 2020

(30) Foreign Application Priority Data

Jun. 16, 2017 (JP) .............................. JP2017-119123

(51) Int. Cl.
*A47L 13/16* (2006.01)
*A47L 13/20* (2006.01)
*B32B 3/30* (2006.01)
*B32B 5/26* (2006.01)
*D04H 1/498* (2012.01)
(Continued)

(52) U.S. Cl.
CPC ............... *A47L 13/16* (2013.01); *A47L 13/20* (2013.01); *A47L 13/24* (2013.01); *A47L 13/256* (2013.01); *B32B 3/30* (2013.01); *B32B 5/022* (2013.01); *B32B 5/067* (2021.05); *B32B 5/26* (2013.01); *B32B 5/266* (2021.05); *D04H 1/498* (2013.01); *B32B 2250/20* (2013.01); *B32B 2250/40* (2013.01); *B32B 2432/00* (2013.01)

(58) Field of Classification Search
CPC .......... A47L 13/16; A47L 13/42; A47L 13/20; A47L 13/24; A47L 13/256
See application file for complete search history.

(56) References Cited

FOREIGN PATENT DOCUMENTS

| CN | 1199108 A | 11/1998 |
|---|---|---|
| DE | 202015103600 U1 | 10/2016 |

(Continued)

OTHER PUBLICATIONS

Translation of International Search Report dated Aug. 21, 2018 and Written Opinion of corresponding application No. PCT/JP2018/019762; 8 pgs.

(Continued)

*Primary Examiner* — Shay Karls
(74) *Attorney, Agent, or Firm* — Maier & Maier, PLLC

(57) ABSTRACT

This cleaning sheet is provided with an embossed part in which the sheet is compressed in the thickness direction. The cleaning sheet is provided with outer layers, forming the surfaces of the sheet; and an inner layer sandwiched between the outer layers. In the boundary areas between the outer layers, and the inner layer, the fibers of the layers are entangled. This allows for a sheet that better retains the raised and sunken shapes embossed therethrough and exhibits excellent collecting performance.

3 Claims, 6 Drawing Sheets

(51) Int. Cl.
*A47L 13/256* (2006.01)
*A47L 13/24* (2006.01)
*B32B 5/06* (2006.01)
*B32B 5/02* (2006.01)

(56) References Cited

FOREIGN PATENT DOCUMENTS

| | | |
|---|---|---|
| EP | 0864289 A2 | 9/1998 |
| JP | 3559533 B2 | 9/2004 |
| JP | 2007-236863 A | 9/2007 |
| JP | 2007236863 A | 9/2007 |
| JP | 2016223050 A | 12/2016 |
| JP | 2016223051 A | 12/2016 |
| JP | 201713484 A | 1/2017 |
| JP | 2017006610 A | 1/2017 |
| WO | 2004/080256 A1 | 9/2004 |
| WO | 2016/035767 A1 | 3/2016 |
| WO | 2016035767 A1 | 3/2016 |
| WO | 2016159145 A1 | 10/2016 |
| WO | 2016/194460 A1 | 12/2016 |
| WO | 2017002416 A1 | 1/2017 |

OTHER PUBLICATIONS

Office Action dated Jan. 11, 2022, in connection with corresponding Chinese Application No. 201880036845.2 (8 pp., including machine-generated English translation).

Chinese Office Action dated Jul. 7, 2021 of corresponding application No. 201880036845.2; 8 pgs.

Supplementary European Search Report and European Search Opinion dated May 11, 2020 of corresponding application No. EP18817205; 8 pgs.

Japanese Office Action dated Nov. 20, 2018 of corresponding application No. 2017119123; 6 pgs.

Japanese Office Action dated Jan. 29, 2019 of corresponding application No. 2017119123; 6 pgs.

Decision to Grant a Patent dated May 14, 2019 of corresponding application No. 2017119123; 5 pgs.

Chinese Office Action dated Dec. 3, 2020 of corresponding application No. 201880036845.2; 12 pgs.

[FIG. 1]
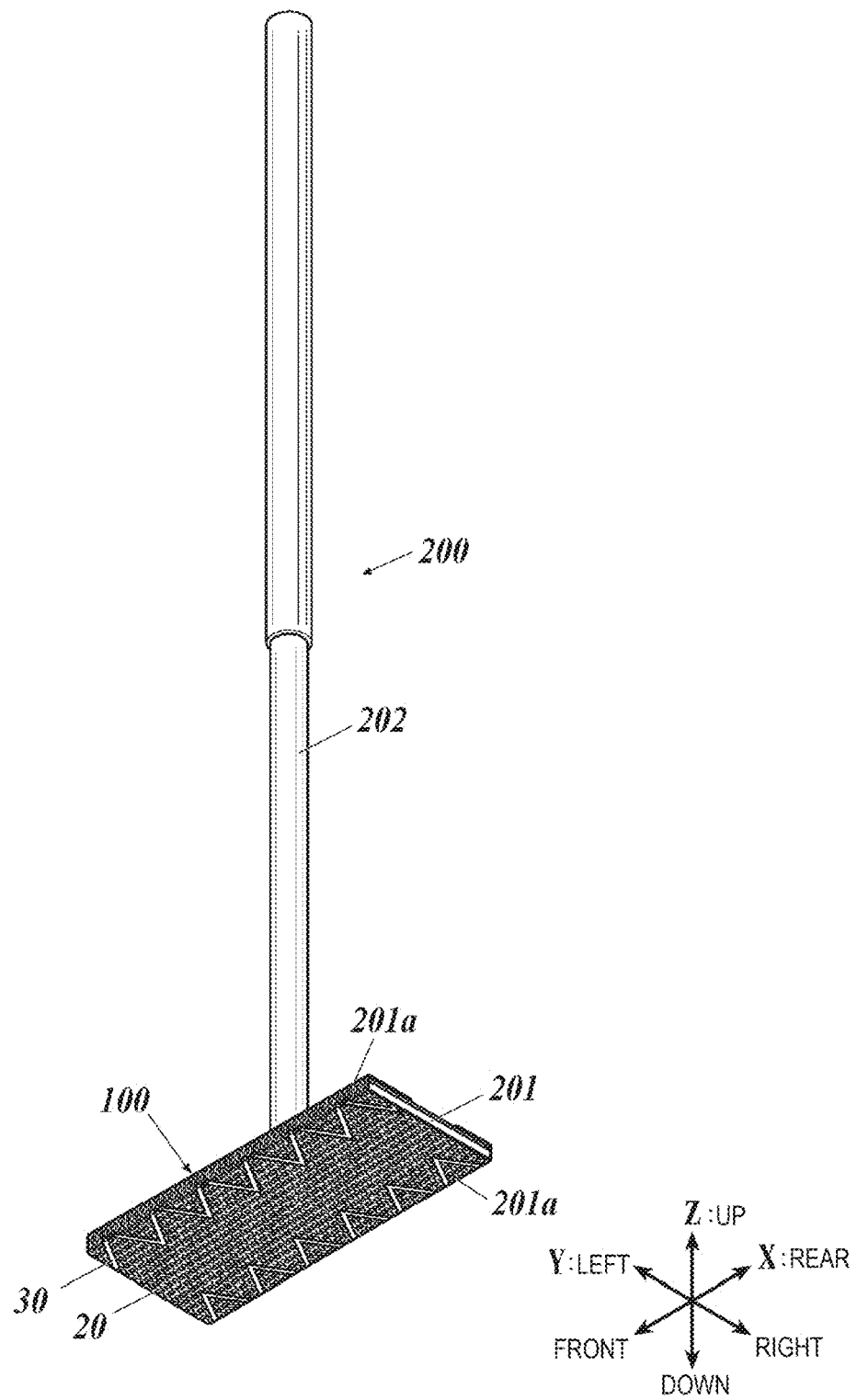

[FIG. 2]
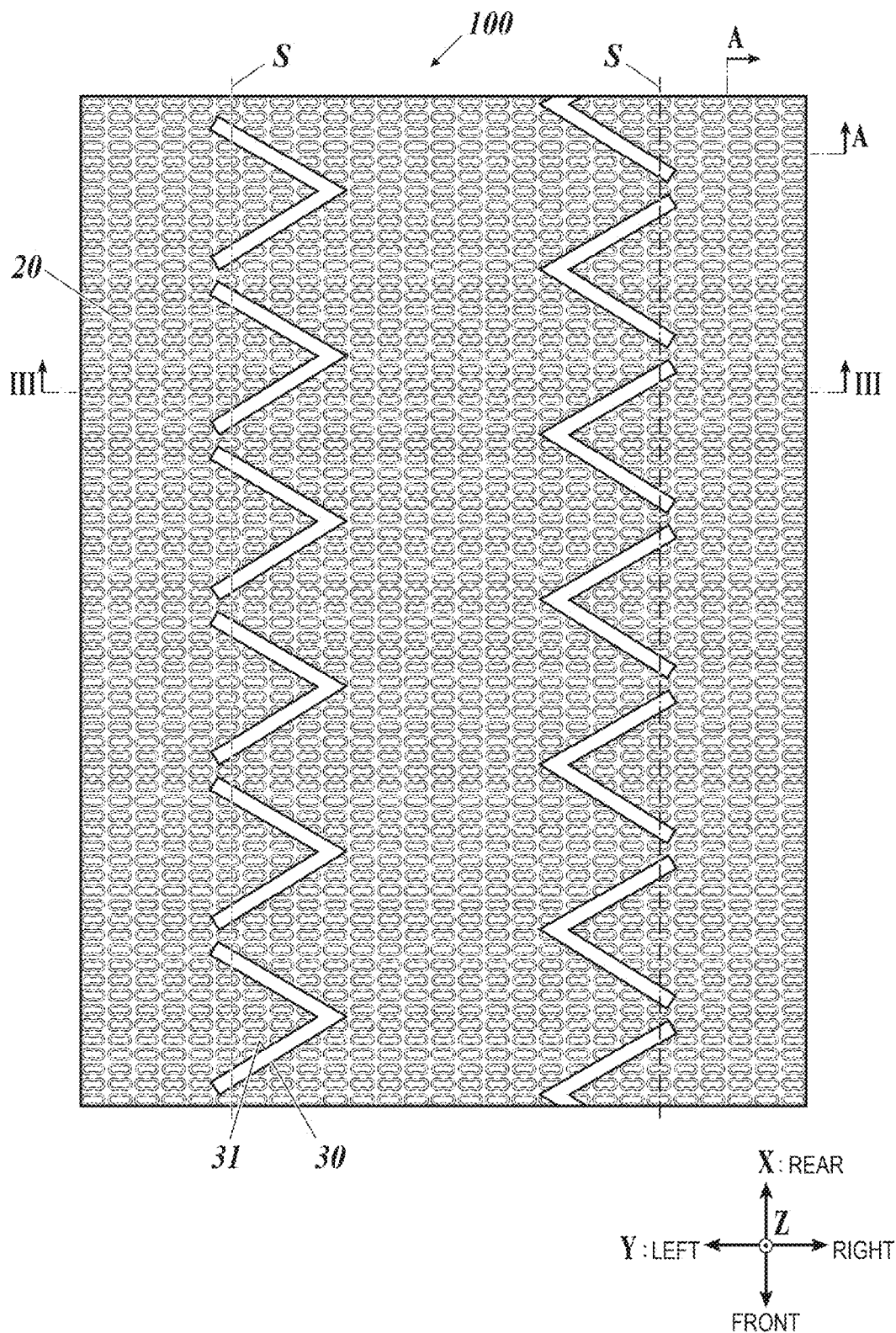

[FIG. 3]
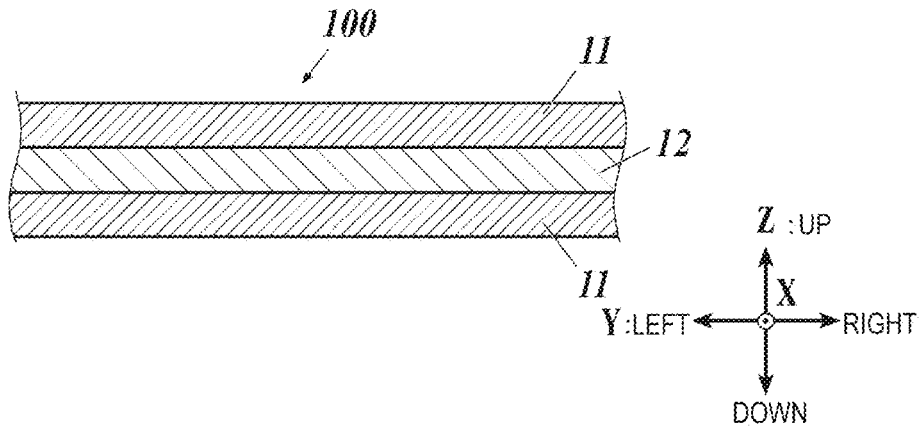
[FIG. 4]
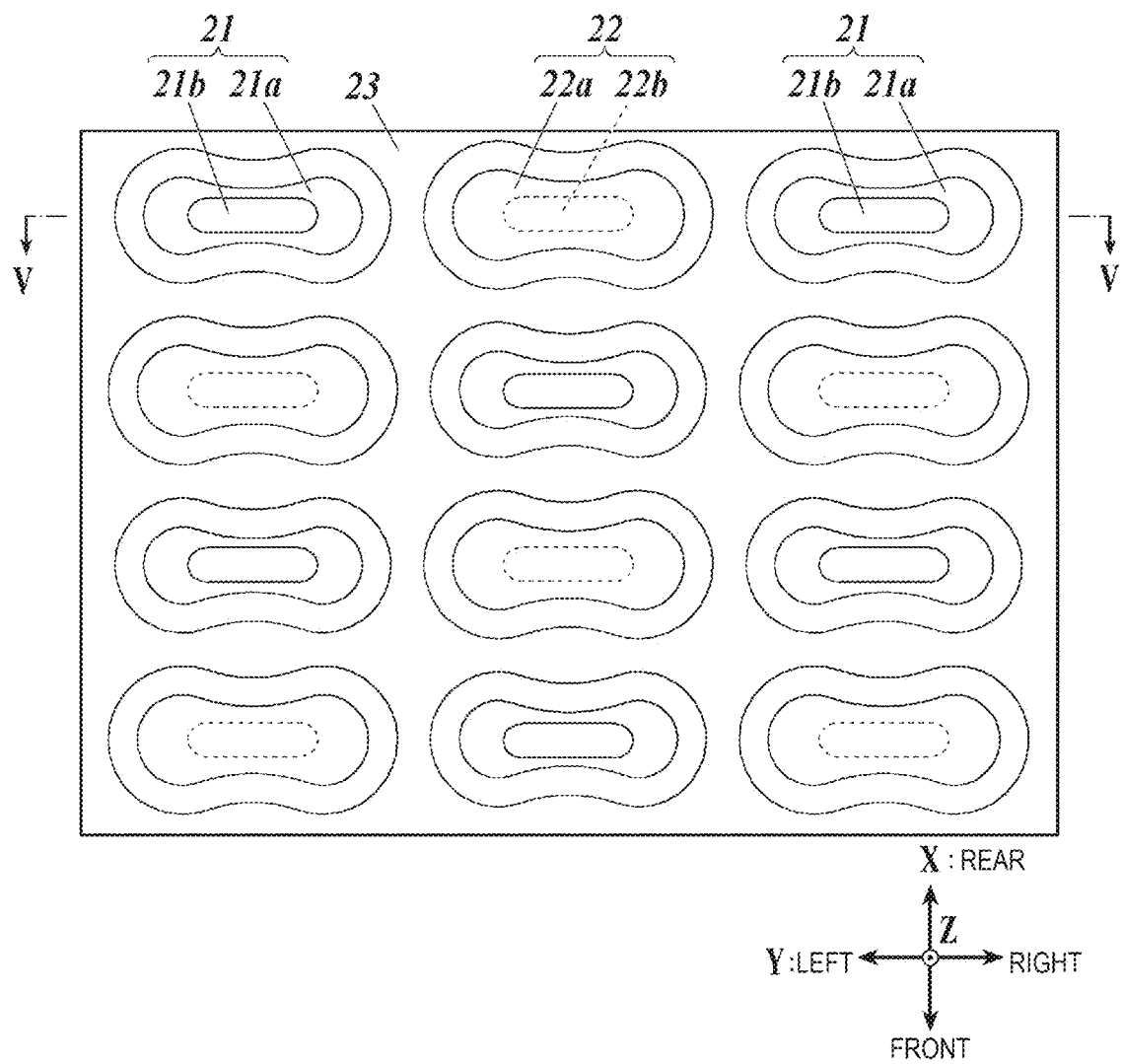

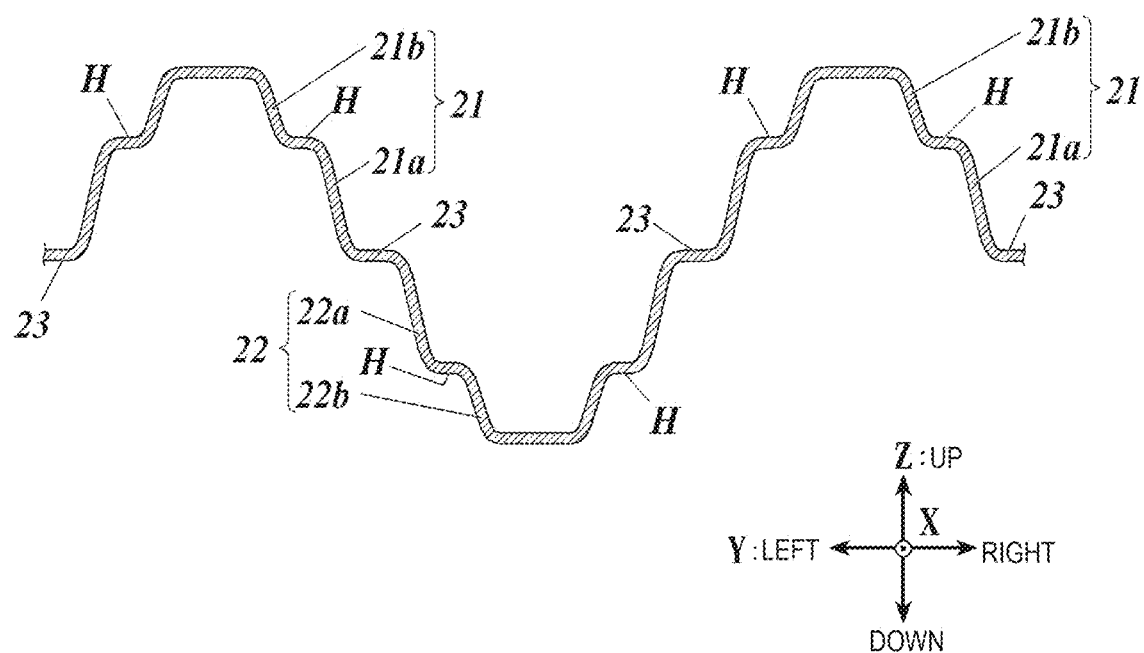
[FIG. 5]

[FIG. 6A]
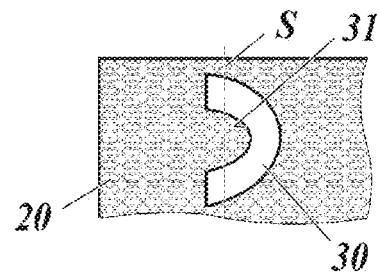
[FIG. 6B]
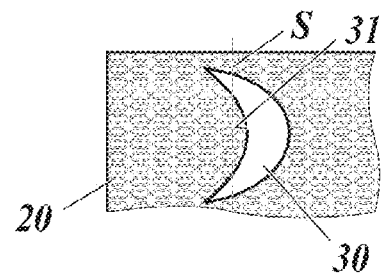
[FIG. 6C]
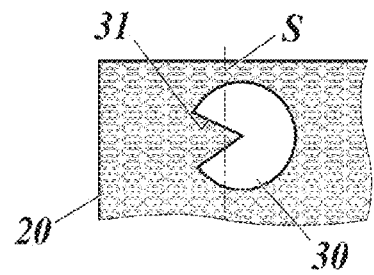
[FIG. 6D]
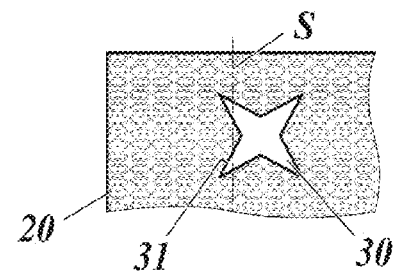

[FIG. 7]
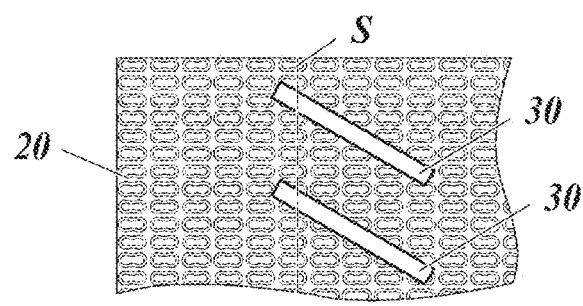

CLEANING SHEET

FIELD

The present invention relates to a cleaning sheet.

BACKGROUND

Conventionally, for example, in the cleaning sheet used for cleaning a floor surface, raised and sunken shapes are formed on the sheet with various patterns in order to increase bulk and thickness, to reduce frictional resistance, and to improve dust collecting performance.

For example, Patent Literature 1 describes forming the raised and sunken shapes by providing a V-shaped low-density area in a sheet fiber.

Patent Literature 1: Japanese Patent No. 3,559,533

SUMMARY

However, in the above Patent Literature 1, since strength of the sheet falls by providing the low-density area, the raised and sunken shapes are likely to collapse and the collecting performance may be degraded.

Therefore, an object of the present invention is to provide the cleaning sheet that better retains the raised and sunken shapes of the sheet and exhibits excellent collecting performance.

In order to solve the above problems, the embodiments herein disclose a cleaning sheet including an embossed part in which the sheet is compressed in a thickness direction thereof, further including: outer fiber layers forming surfaces of the sheet; and an inner fiber layer sandwiched between the outer fiber layers, wherein fibers of the layers are entangled in boundary areas between the outer fiber layers and the inner fiber layer.

According to the embodiments, it is possible to provide the cleaning sheet that better retains the raised and sunken shapes of the sheet and exhibits excellent collecting performance.

The embodiments herein further disclose that the embossed part includes a raised emboss projecting to one surface side and a sunken emboss projecting to the other surface side of the sheet as viewed from the one surface of the sheet.

According to the embodiments, it is possible to further improve the collecting performance.

The embodiments herein further disclose that the raised emboss includes a first raised part projecting from the one surface and a second raised part further projecting from a top portion of the first raised part, and the sunken emboss includes a first sunken part projecting from the other surface and a second sunken part further projecting from a top portion of the first sunken part.

According to the embodiments, it is possible to further improve the collecting performance.

The embodiments herein further disclose that the cleaning sheet is formed in a rectangular shape, and the raised emboss and the sunken emboss are alternately arranged in both a longitudinal direction and a short direction of the cleaning sheet.

According to the embodiments, it is possible to further improve the collecting performance.

The embodiments herein further disclose a non-embossed part in which the embossed part is not disposed.

According to the embodiments, it is possible to further improve the collecting performance.

According to the present invention, it is possible to provide the cleaning sheet that better retains the raised and sunken shapes of the sheet and exhibits excellent collecting performance.

BRIEF DESCRIPTION OF THE DRAWINGS

FIG. 1 is a view showing a state of using a cleaning sheet of the present embodiment.

FIG. 2 is a plan view showing an example of the cleaning sheet.

FIG. 3 is a cross-sectional view taken along a line III-III of FIG. 2.

FIG. 4 is an enlarged view of a portion A in FIG. 2.

FIG. 5 is a cross-sectional view taken along a line V-V of FIG. 4.

FIG. 6A is a view showing a modified example of a non-embossed part.

FIG. 6B is a view showing the modified example of the non-embossed part.

FIG. 6C is a view showing the modified example of the non-embossed part.

FIG. 6D is a view showing the modified example of the non-embossed part.

FIG. 7 is a view showing the modified example of the non-embossed part.

DETAILED DESCRIPTION

Hereinafter, specific modes of a cleaning sheet 100 according to an embodiment of the present invention will be described with reference to FIGS. 1 to 7. However, the technical scope of the present invention is not limited to illustrated examples.

For convenience, as shown in FIGS. 1 to 7, X direction, Y direction, Z direction, front and back, left and right, and up and down are defined and described.

(Structure of Embodiment)

FIG. 1 is a view showing a state of using the cleaning sheet 100 of the present embodiment.

As shown in FIG. 1, the cleaning sheet 100 is a dry sheet exchangeably attached to a cleaning tool 200 including, for example, a rectangular flat head portion 201 and a handle portion 202 attached to an upper surface of the head portion 201.

The cleaning sheet 100 covers a bottom surface of the head portion 201 of the cleaning tool 200 to form a cleaning surface, and is folded along longitudinal edge portions 201a of the head portion 201 of the cleaning tool, to be locked and attached to the upper surface of the head portion 201.

The longitudinal edge portions 201a refer to edge portions in a longitudinal direction of the head portion 201. That is, they refer to two long edge portions out of four edges of the rectangular head portion 201.

FIG. 2 is a plan view showing an example of the cleaning sheet 100 of the present embodiment.

As shown in FIG. 2, the cleaning sheet 100 has a rectangular shape elongated in the X direction, and is formed to have a size of, for example, 250 mm to 300 mm, preferably 260 mm to 290 mm in the X direction (longitudinal direction), and 180 mm to 230 mm, preferably 200 mm to 210 mm in the Y direction (a short direction).

FIG. 3 is a cross-sectional view taken along a line III-III of FIG. 2.

The cleaning sheet 100 is a sheet formed by ply process (stack) of a plurality of base papers, and for example, as shown in FIG. 3, has a three-layer structure including outer layers 11 and 11 which form surface layers of the cleaning sheet 100, and an inner layer 12 sandwiched between the outer layers 11 and 11.

(Outer Layer: Outer Fiber Layer)

The outer layer 11 is an outer fiber layer which forms a surface of the cleaning sheet 100.

The outer layer 11 is mainly formed of hydrophobic fibers. Chemical fibers mainly containing polyethylene terephthalate, polypropylene, polyethylene or the like are used as the hydrophobic fibers.

It is preferred for the outer layer 11 that a compounding ratio of polyethylene terephthalate fiber is 80% or more, and a fiber diameter is 3.3 dtex or more. By setting the fiber diameter to 3.3 dtex or more, rigidity (cushioning property) of the fiber is improved, so that it can be operated even with a light force.

The outer surface of the outer layer 11 is the surface of the cleaning sheet 100.

(Inner Layer: Inner Fiber Layer)

The inner layer 12 is an inner fiber layer sandwiched between the outer layers 11 and 11.

The inner layer 12 contains hydrophilic fibers as a main component. As the hydrophilic fibers, for example, natural fibers such as pulp, cotton or hemp, or cellulose-based chemical fibers such as rayon or acetate are used, however, it is preferable to use pulp or pulp air laid from the viewpoint of maintaining water retention.

Although it is preferable to form the inner layer 12 only with the hydrophilic fibers, the hydrophobic fibers such as a polypropylene spunbond may be suitably contained as a reinforcing layer.

A basis weight of the inner layer 12 is 5 gsm to 50 gsm, and preferably 10 gsm to 30 gsm. By setting the basis weight of the inner layer 12 to 5 gsm to 50 gsm, an embossed shape can be formed by heat embossing without losing texture. Further, the embossed shape can be easily retained in cleaning a flooring or the like.

Note that when cleaning of a hard portion to be cleaned such as a tile is assumed, the basis weight of the inner layer 12 is not limited to the above range, a value of the basis weight can be increased.

Further, in boundary areas between the outer layers 11, 11 and the inner layer 12 in the cleaning sheet 100, the fibers of the layers are entangled with each other, which facilitates formation of embossed shape by heat embossing, and the embossed shape can be easily retained during cleaning.

A sheet structure of the cleaning sheet 100 described above is merely an example, and the number of layers, fibers which can be contained in each layer, and the like can be changed as appropriate.

For example, in the present embodiment, the cleaning sheet 100 is described as the dry sheet, but may be a wet sheet to which a chemical solution is applied. In this case, the hydrophilic fibers of the inner layer 12 can be impregnated with the chemical solution. Note that pulp or pulp air laid may be used from the viewpoint of securing water retention.

Returning to FIG. 2, in the cleaning sheet 100, portions which are folded along the longitudinal edge portions 201a of the head portion 201 of the cleaning tool 200 are referred to as folded portions S.

An approximate position of the folded portion S is set in advance in accordance with the head portion 201 of the specified cleaning tool 200. That is, two rows of folded portions S extending in the X direction are set at predetermined positions in the Y direction of the cleaning sheet 100. For example, a straight line corresponding to the folded portion S may be printed on the cleaning sheet 100, or a polygonal line corresponding to the folded portion S may be formed on the cleaning sheet 100 in advance, so that the user can recognize the folded portion S.

Then, a plurality of non-embossed parts 30 are arranged at predetermined intervals in the X direction along the folded portion S of the cleaning sheet 100, and an embossed part 20 is disposed over an entire area except areas in which the non-embossed parts 30 of the cleaning sheet 100 are arranged.

Thus, the embossed part 20 and the non-embossed part 30 are alternately arranged at positions corresponding to the longitudinal edge portions 201a of the head portion 201 of the cleaning tool 200 in the cleaning sheet 100.

(Embossed Part)

The embossed part 20 is a part of the cleaning sheet 100 in which the sheet is compressed in a thickness direction thereof.

The embossed part 20 can be formed by heat embossing, for example, under conditions of a temperature of 80 to 130° C. and an embossing pressure of 0.2 to 1.0 MPa.

FIG. 4 is an enlarged view of a region A of FIG. 2. FIG. 5 is a cross-sectional view taken along a line V-V of FIG. 4.

As shown in FIGS. 4 and 5, the embossed part 20 is formed with a raised emboss 21 projecting upward (projecting to one surface side of the cleaning sheet 100) and a sunken emboss 22 projecting downward (projecting to the other surface side of the cleaning sheet 100, that is, being recessed).

The raised emboss 21 and the sunken emboss 22 are alternately arranged in both the X direction and the Y direction. By alternately arranging the raised emboss 21 and the sunken emboss 22 regularly as described above, dust collecting performance can be improved.

In the embossed part 20, an intermediate part 23 is formed between the raised emboss 21 and the sunken emboss 22 alternately arranged. The intermediate part 23 is a portion in which the raised emboss 21 and the sunken emboss 22 are not formed, and thus the intermediate part 23 is lower than the raised emboss 21 and higher than the sunken emboss 22 in the Z direction.

Note that it is not essential to have the above embossed pattern. Although an effect of improving the dust collecting performance is reduced, it may be the embossed pattern in which the raised embosses 21 or the sunken embosses 22 are arranged in a line, or the embossed pattern in which the embosses are irregularly arranged. Further, for example, it may include only either the raised emboss 21 or the sunken emboss 22.

(Raised Emboss)

As shown in FIG. 4, the raised emboss 21 is formed in a so-called gourd shape having a narrow width in the X direction and a constricted portion in a central portion in the Y direction in plan view. Although the above-described shape is preferable from the viewpoint of dust collecting performance, the shape of the raised emboss 21 is not limited to this, and can be formed into various shapes such as a circle, an ellipse, and a polygon. Further, the shapes may be combined.

The raised emboss 21 is 2 mm to 5 mm, preferably 3 mm to 4 mm in the X direction, 5 mm to 10 mm, preferably 6 mm to 8 mm in the Y direction, and 0.5 mm to 2 mm, preferably 0.7 mm to 1.5 mm (height from the intermediate part 23) in the Z direction.

As shown in FIG. 5, the raised emboss 21 is formed in a shape projecting upward in a step-wise manner in a cross-sectional view. That is, in the cross-sectional view, a second raised part 21b projecting further upward is formed on a top portion of a first raised part 21a projecting from the surface (an upper surface) of the sheet.

More specifically, the top portion of the first raised part 21a has planar stage parts H of 0.5 mm to 3 mm, preferably 1 mm to 2 mm at both ends in the Y direction, and has the second raised part 21b in the central portion in the Y direction.

With such a structure, the cushioning property of the cleaning sheet 100 can be improved, and the embossed shape can be easily retained during cleaning.
(Sunken Emboss)

As shown in FIG. 4, the sunken emboss 22 is formed in the so-called gourd shape which is substantially the same shape as the raised emboss 21 in plan view. The shape of the sunken emboss 22 is not limited to this, but can be formed into various shapes, and may be a different shape from the raised emboss 21.

Further, as shown in FIG. 5, the sunken emboss 22 is formed in a shape recessed downward in a stepwise manner, which is upside down with the raised emboss 21 in the cross-sectional view. That is, in the cross-sectional view, a second sunken part 22b projecting further downward is formed at a top portion of a first sunken part 22a projecting from the surface (a lower surface) of the sheet.

More specifically, the top portion of the first sunken part 22a has planar stage parts H of 0.5 mm to 3 mm, preferably 1 mm to 2 mm at both ends in the Y direction, and has the second sunken part 22b in the central portion in the Y direction.

With such a structure, the cushioning property of the cleaning sheet 100 can be improved, and the embossed shape can be easily retained during cleaning.
(Non-Embossed Part)

The non-embossed part 30 is a part of the cleaning sheet 100 in which the sheet is not compressed in the thickness direction but has raised fibers, and the plurality of non-embossed parts 30 are arranged along the rows of folded portions S of the cleaning sheet 100.

The non-embossed part 30 can be formed by designing an embossing roll forming the embossed part 20 so as to exclude the shape of the non-embossed part 30.

The non-embossed part 30 is not limited to a case where compression is not performed at all, but may be lightly compressed as compared with a portion in which the embossed part 20 is compressed to an extent that the raised fibers remain. Further, the non-embossed part 30 may include a portion in which the fibers are not raised.

A size of the non-embossed part 30 is 40 to 70 mm, preferably 50 to 60 mm in the X direction, and 15 to 70 mm, preferably 20 to 50 mm in the Y direction.

By this setting, when forming a folded line corresponding to the folded portion S in the cleaning sheet 100 in production, the folded line can be formed at an appropriate position even when the folded line is meandered by an apparatus.
(Sunken Part)

Each of the non-embossed parts 30 preferably has a shape having a sunken part 31 open to the longitudinal edge portion 201a of the head portion 201 in a state where the cleaning sheet 100 is attached to the cleaning tool 200.

Specifically, for example, as shown in FIG. 2, the non-embossed part 30 can be formed in a V-shape in plan view, which is open in a right direction or a left direction, that is, open to a long side from the central portion of the rectangular cleaning sheet 100. That is, if the non-embossed part 30 has the V-shape in plan view, it has a V-shaped sunken part 31.

Thus, when cleaning is performed by moving the cleaning sheet 100 in the Y direction, that is, in a direction parallel to a short side of the cleaning sheet 100, dust is easily accumulated in the sunken part 31 so that the dust collecting performance can be further improved.

Further, as shown in FIG. 2, the non-embossed parts 30 are arranged so that positions in the X direction are shifted for each row and alternate with each other. That is, the non-embossed part 30 along the folded portion S corresponding to one of the longitudinal edge portions 201a of the head portion 201 and the non-embossed part 30 along the folded portion S corresponding to the other of the longitudinal edge portions 201a of the head portion 201 are arranged at different positions in an extending direction of the folded portion S.

Thus, when cleaning is performed by moving the cleaning sheet 100 in the Y direction, that is, in the direction parallel to the short side of the cleaning sheet 100, the collecting performance are mutually complemented, and the non-embossed part 30 passes through a floor surface without a gap, so that the dust collecting performance can be improved.
(Method of Producing Cleaning Sheet)

Next, a method of producing the cleaning sheet 100 will be described.

The method of producing the cleaning sheet 100 includes a laminating step of laminating a plurality of fiber layers, and an embossing step of pressing and embossing a laminated sheet with a pair of embossing rolls.

In the laminating step, the laminated sheet in which the fibers of each of the outer layers 11, 11 and the inner layer 12 are entangled in the boundary areas can be produced by a hydroentangling method.

In the embossing step, the embossed part 20 can be formed in the cleaning sheet 100 by heat embossing, for example, under the conditions of a temperature of 80 to 130° C. and an embossing pressure of 0.2 to 1.0 MPa.

By the embossing step, the fibers of the inner layer 12 enter the fibers of the outer layers 11, 11 and come out to the surface or a vicinity of the surface of the outer layers 11, 11 (the cleaning sheet 100).

Specifically, the fibers of the inner layer 12 come out to edge portions or the like of the second raised part 21b and the second sunken part 22b.

Thus, when the cleaning sheet 100 is the dry sheet, presence of the hydrophilic fibers on the surface or in the vicinity of the surface of the outer layers 11, 11 (the cleaning sheet 100) makes it easy to wipe off dirty liquid. When the cleaning sheet 100 is the wet sheet, the chemical solution exudes from the hydrophilic fibers on the surface or in the vicinity of the surface of the outer layers 11, 11 (the cleaning sheet 100), so that a portion that is most in contact with the portion to be cleaned can effectively wipe and clean the portion to be cleaned.

The non-embossed part 30 can be formed by designing the embossing roll forming the embossed part 20 so that the shape of the non-embossed part 30 can be excluded.
(Method of Using Cleaning Sheet)

Next, a method of using the cleaning sheet 100 will be described.

In use, the cleaning sheet 100 is attached to the rectangular flat head portion 201 of the cleaning tool 200.

Specifically, the head portion 201 is placed on the cleaning sheet 100 such that the longitudinal edge portions 201a of the head portion 201 are aligned with the two rows of folded portions S extending in the X direction of the cleaning sheet 100. Next, the cleaning sheet 100 is folded along the longitudinal edge portions 201a of the head portion 201, and both side portions of the folded sheet are locked to the upper surface of the head portion 201.

Thus, for example, as shown in FIG. 1, the central portion in the Y direction of the cleaning sheet 100 covers the bottom surface of the head portion 201 of the cleaning tool 200 to form the cleaning surface, and the embossed parts 20 and the non-embossed parts 30 are alternately arranged in the cleaning sheet 100 at the positions corresponding to the longitudinal edge portions 201a of the head portion 201, that is, along the folded portions S.

In this state, when cleaning is performed by moving the cleaning sheet 100 mainly in the Y direction, that is, in the short direction of the cleaning sheet 100, the embossed part 20 can scrape fine dust such as sand dust and house dust, and the raised fibers of the non-embossed part 30 can capture coarse dust such as hair and fiber dust.

More specifically, the coarse dust accumulates in the sunken part 31 of the non-embossed part 30, and the fine dust can be scraped off by the embossed part 20 between the non-embossed parts 30, and the embossed part 20 disposed on the cleaning surface.

At this time, in the cleaning sheet 100, since the fibers of the layers are entangled in the boundary areas between the outer layers 11, 11 and the inner layer 12, the shape of the embossed part 20 can be easily retained, and excellent collecting performance can be realized.

The embossed part 20 is gradually crushed at the second raised part 21b and the first raised part 21a (or the second sunken part 22b and the first sunken part 22a) with progress of cleaning work, and an area of the cleaning surface is gradually increased, so that it can be used for a long time.
(Effect of Embodiment)

As described above, according to the present embodiment, the cleaning sheet 100 including the embossed part 20 in which the sheet is compressed in the thickness direction includes the outer layers 11, 11 forming the surface of the sheet and the inner layer 12 sandwiched between the outer layers 11 and 11. In the boundary areas between the outer layers 11, 11 and the inner layer 12, the fibers of the layers are entangled with each other.

Therefore, it is easy to form the embossed shape by heat embossing in production, and the embossed shape can be easily retained during cleaning.

Therefore, it is possible to realize the cleaning sheet that better retains the raised and sunken shapes of the sheet and exhibits excellent collecting performance.

According to the present embodiment, when viewed from the one surface (upper surface) of the sheet, the embossed part 20 includes the raised emboss 21 projecting to the one surface side of the sheet and the sunken emboss 22 projecting to the other surface (lower surface) side of the sheet.

Therefore, during cleaning, the embossed part 20 is gradually crushed from the raised emboss 21 to the sunken emboss 22 and the area of the cleaning surface is gradually increased, so that the collecting performance can be maintained for a long time.

According to the present embodiment, the raised emboss 21 includes the first raised part 21a projecting from the one surface (upper surface) of the sheet and the second raised part 21b further projecting from the top portion of the first raised part 21a. The sunken emboss 22 includes the first sunken part 22a projecting from the other surface (lower surface) of the sheet and the second sunken part 22b further projecting from the top portion of the first sunken part 22a.

Therefore, during cleaning, the embossed part 20 is more gradually crushed, so that the collecting performance can be maintained for a longer time.

According to the present embodiment, the cleaning sheet 100 is formed in the rectangular shape, and the raised emboss 21 and the sunken emboss 22 are alternately arranged in both the longitudinal direction and the short direction of the cleaning sheet 100.

Therefore, the raised emboss 21 and the sunken emboss 22 are arranged alternately and regularly, so that the dust collecting performance can be improved.

According to the present embodiment, the cleaning sheet 100 includes the non-embossed part 30 in which the embossed part 20 is not disposed.

The embossed part 20 collects the fine dust and the non-embossed part 30 collects the coarse dust, so that the dust collecting performance can be improved.

The present invention is not limited to the above embodiment, but it is needless to say that the specific structure can be changed as appropriate.

For example, in the above embodiment, the V-shaped non-embossed part 30 is described as an example, however, the shape of the non-embossed part 30 is not limited to this as long as it is a shape having the sunken part 31 open to the edge portion 201a of the head portion 201 in a state of being attached to the head portion 201.

For example, as shown in FIGS. 6A and 6B, it may be a U-shaped non-embossed part 30 having a U-shaped sunken part 31.

Or, as shown in FIG. 6C, it may be a substantially circular non-embossed part 30 having a V-shaped sunken part 31 formed in a part thereof, or as shown in FIG. 6D, a part of a star-shaped non-embossed part 30 may function as the sunken part 31.

The shape of the non-embossed part 30 is most preferably a shape having the sunken part 31 open to the edge portion 201a of the head portion 201 as described above, from the viewpoint of collecting performance, but as shown in FIG. 7, it may be a shape extending in a direction oblique to the edge portion 201a of the head portion 201.

With such a shape, the non-embossed part 30 is disposed obliquely to the edge portion 201a of the head portion 201, so that it can collect dust.

In the above embodiment, a structure in which the non-embossed part 30 is disposed in the cleaning sheet 100 has been described as an example, however, the non-embossed part 30 may not be disposed. That is, the embossed part 20 may be disposed on the entire surface of the cleaning sheet 100.

In the above embodiment, a case where cleaning is performed by moving the cleaning sheet 100 in the Y direction thereof has been described as an example, however, the non-embossed part 30 may be formed to have a shape open to the short side from the central portion of the rectangular cleaning sheet 100 in consideration of cleaning by moving the cleaning sheet 100 in a direction parallel to the long side of the cleaning sheet 100.

In this case, the cleaning sheet 100 is folded along edge portions in the short direction of the head portion 201, and both ends of the folded sheet are locked to the upper surface of the head portion 201.

In the above embodiment, a case where the cleaning sheet 100 is attached to the cleaning tool 200 has been described as an example, however, it is also possible to use the cleaning sheet 100 without attaching it to the cleaning tool 200.

EXAMPLES

Next, Examples and Comparative Examples of the present invention will be described. Hereinafter, the present invention will be specifically described by way of Examples, but the present invention is not limited thereto.

Example 1

As the outer layer, a non-woven fabric made of 100% hydrophobic fibers containing 80% of polyethylene terephthalate fibers and 20% of core-sheath fibers of polypropylene and polyethylene as binder fibers was prepared. The polyethylene terephthalate fiber having a fineness of 3.3 dtex and the binder fiber having a fineness of 1.7 dtex were used. The basis weight of the outer layer was 25 gsm.

As the inner layer, a spun bond nonwoven fabric of 100% of polypropylene was prepared. The basis weight of the inner layer was 15 gsm.

The outer layer and the inner layer described above were entangled by the hydroentangling method to produce the laminated sheet which is a span lace nonwoven fabric having a three-layer structure.

The laminated sheet was embossed at a temperature of 105° C. and an embossing pressure of 0.6 MPa to produce a rectangular dry sheet having the embossed part and the non-embossed part as shown in FIG. 2, and was used as the cleaning sheet of Example 1.

The basis weight of the cleaning sheet was 100 gsm, the long side was 300 mm and the short side was 200 mm.

In the embossed part, the gourd-shaped raised emboss and sunken emboss are alternately arranged in both a long side direction and a short side direction of the cleaning sheet, and sizes of the raised emboss and the sunken emboss were both 8 mm in the long side, 3 mm in the short side, and 0.8 mm in height in a projecting direction thereof.

Both the raised emboss and the sunken emboss included the stage part, and its size was 1.5 mm.

The non-embossed portion had the V-shape in plan view, which is open to the long side from the central portion of the cleaning sheet, an entire length in the long side direction of the non-embossed part was 45 mm, and the entire length in the short side direction was 35 mm. A length of the longest part in the long side direction of the sunken part of the non-embossed part was 20 mm.

A distance between the non-embossed parts adjacent in the long side direction was 10 mm.

Comparative Example 1

The dry sheet was produced in the same manner as in Example 1 except that the outer layer and the inner layer the same as in Example 1 were bonded to each other instead of the hydroentangling method to produce the laminated sheet, and was used as the cleaning sheet of Comparative Example 1.

Comparative Example 2

The dry sheet was produced in the same manner as in Example 1 except that the shape of the embossed part was changed as follows, and was used as the cleaning sheet of Comparative Example 2.

In the embossed part, the gourd-shaped raised emboss and sunken emboss are alternately arranged in both the long side direction and the short side direction, and the sizes of the raised emboss and the sunken emboss were both 8 mm in the long side, 3 mm in the short side, and 0.8 mm in height in the projecting direction. The raised emboss and the sunken emboss neither included the stage part.

Comparative Example 3

The dry sheet was produced in the same manner as in Example 1 except that the outer layer and the inner layer the same as in Example 1 were bonded to each other instead of the hydroentangling method to produce the laminated sheet and the shape of the embossed part was the same as in Comparative Example 2, and was used as the cleaning sheet of Comparative Example 3.

Comparative Example 4

The laminated sheet produced by the hydroentangling method in the same manner as in Example 1 was not embossed to produce the dry sheet, and was used as the cleaning sheet of Comparative Example 4.

Comparative Example 5

The outer layer and the inner layer the same as in Example 1 were bonded to each other to produce the laminated sheet, and the laminated sheet was not embossed to produce the dry sheet, and was used as the cleaning sheet of Comparative Example 5.

The collecting performance, emboss state and absorbability of the sheets of Example 1 and Comparative Examples 1 to 5 were evaluated according to the following criteria. The results are shown in Table 1.

<Evaluation of Collecting Performance>

Next, with the cleaning sheets of Example 1 and Comparative Examples 1 to 5 attached to a jig as shown in FIG. 1, the jig was moved in the short side direction of the cleaning sheet for cleaning, and the dust collecting performance was evaluated.

The cleaning tool used here included the head portion to which the cleaning sheet was attached and the handle portion as shown in FIG. 1.

The head portion was configured by attaching a top surface portion and a bottom surface portion, the top surface portion had a rectangular shape with a long side of 240 mm and a short side of 95 mm made of ABS resin (acrylonitrile-butadiene-styrene copolymer synthetic resin), and the bottom portion had a rectangular shape with a long side of 248 mm and a short side of 98 mm made of TPE (thermoplastic elastomer) having a hardness of 70°.

A length of the handle portion was 215 mm in length from a coupling portion with the head portion to a tip end of a handle cap.

Criteria for evaluation are as follows. The results are shown in Table 1.

Excellent: satisfied

Good: almost satisfied although some dust or the like remained

Fair: not satisfied much because dust remained

Poor: not satisfied at all because dust was not collected well

<Evaluation of Emboss State>

Next, with the cleaning sheets of Example 1 and Comparative Examples 1 to 5 attached to the jig as shown in FIG. 1, the jig was moved in the short side direction of the cleaning sheet for cleaning, and the emboss state after cleaning was evaluated according to the following criteria. The results are shown in Table 1.

Excellent: emboss shape was left

Good: emboss shape was almost left

Fair: emboss shape was crushed about half

Poor: emboss shape was crushed more than half

<Evaluation of Absorbability>

Next, with the cleaning sheets of Example 1 and Comparative Examples 1 to 5 attached to the jig as shown in FIG. 1, the jig was moved in the short side direction of the cleaning sheet for cleaning, and the absorbability of dirty liquid was evaluated according to the following criteria. The results are shown in Table 1.

Excellent: well absorbed

Good: absorbed

Fair: not absorbed much

Poor: not absorbed at all

<Comprehensive Evaluation>

Based on the above three evaluations, comprehensive evaluation was performed according to the following criteria. The results are shown in Table 1.

Good: only Excellent or Excellent and Good

Fair: including even one Fair

Poor: including even one Poor

It was also found from Comparative Example 2 that when the embossed part did not include the stage part, the emboss state after cleaning collapsed, and the dust collecting performance is inferior as compared with Example 1.

It was also found from Comparative Examples 2 and 3 that when the method of producing the laminated sheet is the hydroentangling method, the emboss shape was easily retained as compared with a case of bonding.

Further, from Comparative Examples 4 and 5, in the cleaning sheet having no embossed part, the emboss was easily crushed, and the dust collecting performance was not satisfied regardless of the method of producing the laminated sheet.

The chemical solution was applied to the cleaning sheets of Example 1 and Comparative Examples 1 to 5 so that an impregnation rate was 270% to produce the wet sheet, and the collecting performance, the emboss state, and sustained-release were evaluated. The results are shown in Table 2.

Here, the results of the collecting property and the emboss state were the same as the dry sheet of Table 1.

<Evaluation of Sustained-Release>

With the cleaning sheets of Example 1 and Comparative Examples 1 to 5 attached to the jig as shown in FIG. 1, the jig was moved in the short side direction of the cleaning sheet for cleaning, and the sustained-release of chemical solution at this time was evaluated according to the following criteria.

Excellent: release of chemical solution was sustained, and satisfied

Good: chemical solution was released to the extent that there was no problem

Fair: release amount of chemical solution was not enough

Poor: release of chemical solution was not sustained, and not satisfied

TABLE 1

| | Lamination method | Emboss shape | Collecting performance | Emboss state | Absorbability | Comprehensive evaluation |
| --- | --- | --- | --- | --- | --- | --- |
| Example 1 | Hydroentangling method | Embossed part (Stage) | Excellent | Excellent | Excellent | Good |
| Comparative Example 1 | Bonding | Embossed part (Stage) | Good | Good | Fair | Fair |
| Comparative Example 2 | Hydroentangling method | Embossed part (No stage) | Good | Fair | Good | Fair |
| Comparative Example 3 | Bonding | Embossed part (No stage) | Good | Poor | Fair | Poor |
| Comparative Example 4 | Hydroentangling method | No embossed part | Poor | Poor | Poor | Poor |
| Comparative Example 5 | Bonding | No embossed part | Poor | Poor | Poor | Poor |

From the results of Table 1, in the sheet of Example 1, the emboss state after cleaning was excellent, and the dust collecting performance and the absorbability of the liquid were also excellent.

It was found from the sheet of Comparative Example 1 that when the laminated sheet was produced by bonding, the emboss state after cleaning somewhat collapsed, and the dust collecting performance is inferior as compared with Example 1.

<Comprehensive Evaluation>

Based on the above three evaluations, comprehensive evaluation was performed according to the following criteria. The results are shown in Table 2.

Good: only Excellent or Excellent and Good

Fair: including even one Fair

Poor: including even one Poor

TABLE 2

| | Lamination method | Emboss shape | Collecting performance | Emboss state | Sustained-release | Comprehensive evaluation |
|---|---|---|---|---|---|---|
| Example 1 | Hydroentangling method | Embossed part (Stage) | Excellent | Excellent | Excellent | Good |
| Comparative Example 1 | Bonding | Embossed part (Stage) | Good | Good | Fair | Fair |
| Comparative Example 2 | Hydroentangling method | Embossed part (No stage) | Good | Fair | Good | Fair |
| Comparative Example 3 | Bonding | Embossed part (No stage) | Good | Poor | Fair | Poor |
| Comparative Example 4 | Hydroentangling method | No embossed part | Poor | Poor | Poor | Poor |
| Comparative Example 5 | Bonding | No embossed part | Poor | Poor | Poor | Poor |

It was found from the results of Table 2 that both the dust collecting performance and the sustained-release of the chemical solution were excellent and satisfied in the sheet of Example 1.

The present invention is suitable for providing a cleaning sheet used for cleaning a floor surface, and the like.

The invention claimed is:

1. A cleaning sheet for being attached to a head portion of a cleaning tool, comprising:
    an embossed part in which the sheet is compressed in a thickness direction thereof;
    outer fiber layers forming surfaces of the sheet; and
    an inner fiber layer sandwiched between the outer fiber layers;
    wherein fibers of the layers are entangled in boundary areas between the outer fiber layers and the inner fiber layer;
    wherein the embossed part comprises a raised emboss and a sunken emboss as viewed from one surface of the sheet, the raised emboss projecting to one surface side and the sunken emboss projecting to the other surface side of the sheet;
    wherein the raised emboss comprises a first raised part projecting from the one surface and a second raised part further projecting from a top portion of the first raised part; and
    the sunken emboss comprises a first sunken part projecting from the other surface and a second sunken part further projecting from a top portion of the first sunken part.

2. The cleaning sheet according to claim 1, wherein the cleaning sheet is formed in a rectangular shape, and
    the raised emboss and the sunken emboss are alternately arranged in both a longitudinal direction and a short direction of the cleaning sheet.

3. The cleaning sheet according to claim 1, further comprising a non-embossed part in which the embossed part is not disposed.

* * * * *